3,314,759
MAGNESIA FIBER PRODUCT AND A METHOD
FOR MANUFACTURING THE SAME
Nobuo Kawai and Kei Nomura, Tokyo, Japan, assignors to Agency of Industrial Science and Technology, Tokyo, Japan, a corporation of Japan
No Drawing. Filed Sept. 18, 1964, Ser. No. 397,634
Claims priority, application Japan, Sept. 21, 1963, 38/49,651
7 Claims. (Cl. 23—201)

The present invention relates to a method of manufacturing magnesia fibers, in general, and to magnesia fibers having an efficient heat-protectivity against high temperatures and a method of manufacturing such magnesia fibers, in particular.

A light-weight material having sufficient heat-protectivity against temperatures at least higher than 2,000° C., although required in certain fields of application has not been achieved to date.

Inorganic fibers, for example, such as glass-fibers, rock-wool, asbestos, etc. are relatively well known and their heat-protectivity characteristics were heretofore, widely applied especially for heat resistance purposes, however, their maximum capacity for this purpose has always been limited to less than 1,000° C. On the other hand, graphite fibers can actually resist, in a reducing atmosphere, temperatures of up to 2,000° C. while, in an oxidizing atmosphere, graphite fibers show no heat resistance and are burned. In addition, graphite fibrous material usually is a good conductor of electricity, but has insufficient adiabatic characteristics so that an applicable use of graphite fibrous material may be considerably restricted.

In accordance with recently developed information concerning alumina fiber, it is considered that the heat-protectivity thereof should be far lower than 2,000° C., since the melting point of $Al_2O_3$ approximately is 2,050° C.

It is one object of the present invention to provide a revolutionary magnesia fiber having a sufficient heat-protectivity under various atmospheric conditions and manufacturing method for producing the same.

It is another object of the present invention to provide the aforesaid magnesia fiber in which powdered magnesia ($M_gO$) is crystallized into fibrous material whereby a readily used magnesia fiber is produced.

It is still another object of the present invention to provide a product and a method of manufacturing magnesia fibers comprising the steps of mixing a raw material selected from the group consisting of metallic magnesium, calcined magnesium hydroxide, purified magnesia and mixtures thereof with carbon as a reducing agent, heating the mixture at a temperature of at least 1,500° C. in the presence of an atmosphere containing a small amount of oxygen and components selected from the group consisting of carbon dioxide, water vapor, nitrogen, and inert gas, thereby generating a vapor containing magnesium, and the heating further conducted in the presence of a fiber-growing-board comprising a material from the group consisting of magnesia and graphite, and containing a small amount of iron, metallic material of silicon and oxidized material thereof thereby crystallizing the generated vapor into magnesia fibers on the fiber-growing-board.

With these and other objects in view which will become apparent in the following detailed description, the present invention will be clearly understood.

The applicable raw material for producing the product of the present invention essentially consists of a purified magnesia ($M_gO$: melting point 2,800° C. appr.), a metallic magnesium or a magnesium hydroxide calcined at or about 500° C. Added to magnesia or the metallic magnesium is a reducing agent, such as carbon black or graphite, which is properly mixed after addition thereto with of some wax as binder material, together with an appropriate amount of a mixing agent, such as benzene or alcohol. This mixture is then placed in a graphite crucible, upon drying completely, and the graphite crucible is placed into a furnace, the temperature of which is raised to 1,500° C.

With the temperature reaching 1,500° C., metallic magnesium, for example, (boiling point: 1,103° C.) begins to vaporize. On the other hand, the magnesia is readily reduced by the effect of the carbon reducing agent, thereby generating vapors of reduced magnesia containing metallic magnesium therein. Since the vapor generation increases considerably depending upon the temperature elevation, the magnesia fiber product of the present invention crystallizes on a fiber-growing-board in association with any atmosphere containing a small quantity of oxygen mixed with, for example, carbon dioxide, water vapor, nitrogen or inert gas. The magnesia fiber formed on the fiber-growing-board is easily removed therefrom providing a method whereby the product can be simply manufactured. Accordingly, if the product is required to be manufactured continuously, repeating the aforementioned process may be readily accomplished.

The fiber-growing-board is a sintered material comprising a material from the group consisting of magnesia and graphite and containing a few parts of metallic or oxidized contents in such material as iron, silicon etc.

The present method of manufacture and product will be further described in connection with the mechanism of crystal growth of magnesia fiber according to the present invention. Whereas metallic magnesium usually vaporizes at approximately 1,103° C., magnesia is readily reduced at or about 1,500° C. by the effect of the carbon reducing agent contained in the magnesia or the graphite contained in the crucible, whereby the unstable reduced substances vaporize.

This vaporizing reaction may be further increased by an elevation of the furnace temperature. The vaporization occurs in an atmosphere containing such components as carbon dioxide, water vapor, nitrogen, together with a small amount of oxygen or inert gas, and accordingly the vapor of the unstable reduced substances are oxidized, being reacted with the small amount of oxygen contained therein.

Consequently, the vapor develops, accompanying a rapid heat generation, on the fiber-growing-board, whereby a crystallized fibrous material is obtained.

If any metallic component substantially consisting of magnesium or silicon and oxidized substances thereof were contained in the fiber-growing-board, the aforementioned vapor and the growth of the crystallization is greatly promoted due to an appearance of the matrix which was formed by a mutual reaction occurring with the aforementioned components.

The raw magnesia for producing the product of the present invention can be obtained, for example, from the following substances: magnesite, serpentine, dunite, dolomite and sea-water. Magnesia obtained from sea-water is simply produced at low cost.

The magnesia is indispensible to fire-proof material for iron works as the melting point thereof is approximately 2,800° C.

The magnesia fiber obtained from the aforementioned process produces a transparent crystallized body less than 100μ in diameter with scores of 10 mm. in length having a circular shaped cross-section.

In accordance with observation by X-ray analysis, the product of the present invention shows a perfect form of stabilized periclase crystals at high temperatures.

The material maintains this stability at temperatures of 2,100° C.

Several experimental examples of the present invention follow:

*Example 1*

Magnesia powder (sea-water magnesia calcined at 600° C.) and carbon black powder were mixed in a 7:3 mol ratio.

A small amount of beeswax as binder and an appropriate amount of benzene as mixing agent were further added thereto and the mixture was sufficiently mixed together.

The mixture was then dried up completely by means of a drying apparatus after being formed like a circular plate by pressing with a molding pressure of 100 kg./cm.$^2$ by a hydraulic press. The product obtained therefrom was placed in a graphite crucible and covered by a lid which lid served as the fiber-growing-board. The lid-plate consisted of a magnesia plate containing 10% silica and 1% iron oxide.

The crucible was then placed into an induction furnace and the induction furnace filled with carbon dioxide. By maintaining the temperature therein at 1,650° C. which was raised at the rate of 15° C./min., the fibrous crystals appeared fitted on the fiber-growing-board, being generated by a white vapor containing magnesium.

The magnesia fiber is removed from the fiber-growing-board when the length of the fibrous material shows a satisfactorily desired length.

In this example, a magnesia fiber, 2 g. by weight, was obtained by maintaining the product at 1,650° C. for 10 minutes with a basic composition consisting of 10 g. of magnesia and 1.3 g. of carbon black.

Further, the product showed 20 mm. in length and less than 100μ in diameter.

*Example 2*

A mixture consisting of magnesia powder (the same material as in Example 1), metallic magnesium powder (all passing through a 20 mesh screen) and carbon black powder in a 1:1:2 mol ratio was treated by the aforementioned process and a 1.5 g. of magnesia fiber was produced. The respective amounts of raw materials were 4.5 g. of magnesia, 2.8 g. of magnesium and 2.7 g. of carbon black.

*Example 3*

A mixture consisting of 4.5 g. of magnesium powder (same material as in Example 1) and 2.7 g. of carbon black in a 1:1 mol ratio was treated by the process stated in Example 1 and 1.5 g. of magnesia fiber were obtained therefrom.

While we have disclosed several embodiments of the present invention, it is to be understood that these embodiments are given by example only and not in a limiting sense, the scope of the present invention being determined by the objects and the claims.

What we claim is:

1. A method of manufacturing magnesia fibers comprising the steps of
mixing a raw material selected from the group consisting of metallic magnesium, calcined magnesium hydroxide, purified magnesia and mixtures thereof with carbon as a reducing agent,
heating said mixture at a temperature of at least 1,500° C. in the presence of an atmosphere containing a small amount of oxygen and components selected from the group consisting of carbon dioxide, water vapor, nitrogen, and inert gas, thereby generating a vapor containing magnesium, and
said heating further conducted in the presence of a fiber-growing-board comprising a material selected from the group consisting of magnesia and graphite, and containing a small amount of a material selected from the group consisting of iron, metallic material of silicon and oxidized material thereof thereby crystallizing the generated vapor into magnesia fibers on said fiber-growing-board.

2. The method, as set forth in claim 1, further including the steps of
mixing a small amount of wax binder material together with a mixing agent selected from the group consisting of benzol, alcohol and mixtures thereof, in with said mixture, and
subsequently drying said mixture prior to said heating step.

3. The method, as set forth in claim 1, wherein said raw material is magnesia in a powdered state.

4. The method, as set forth in claim 3, wherein said powdered magnesia is obtained from sea-water.

5. The method, as set forth in claim 3, wherein said reducing agent is carbon black.

6. The method, as set forth in claim 5, wherein said atmosphere contains carbon dioxide.

7. A magnesia fiber product as produced by the steps of
mixing a raw material selected from the group consisting of metallic magnesium, calcined magnesium hydroxide, purified magnesia and mixtures thereof with carbon as a reducing agent,
heating said mixture at a temperature of at least 1,500° C. in the presence of an atmosphere containing a small amount of oxygen and components selected from the group consisting of carbon dioxide, water vapor, nitrogen, and inert gas, thereby generating a vapor containing magnesium, and
said heating further conducted in the presence of a fiber-growing-board comprising a material selected from the group consisting of magnesia and graphite, and containing a small amount of a material selected from the group consisting of iron, metallic material of silicon and oxidized material thereof thereby crystallizing the generated vapor into magnesia fibers on said fiber-growing-board.

References Cited by the Examiner

UNITED STATES PATENTS

| | | | |
|---|---|---|---|
| 2,215,966 | 9/1940 | Lee et al. | 23—201 |
| 2,862,792 | 12/1958 | Rehm | 23—201 X |
| 3,147,085 | 9/1964 | Gatti | 23—294 X |

OSCAR R. VERTIZ, *Primary Examiner.*

G. T. OZAKI, *Assistant Examiner.*